UNITED STATES PATENT OFFICE.

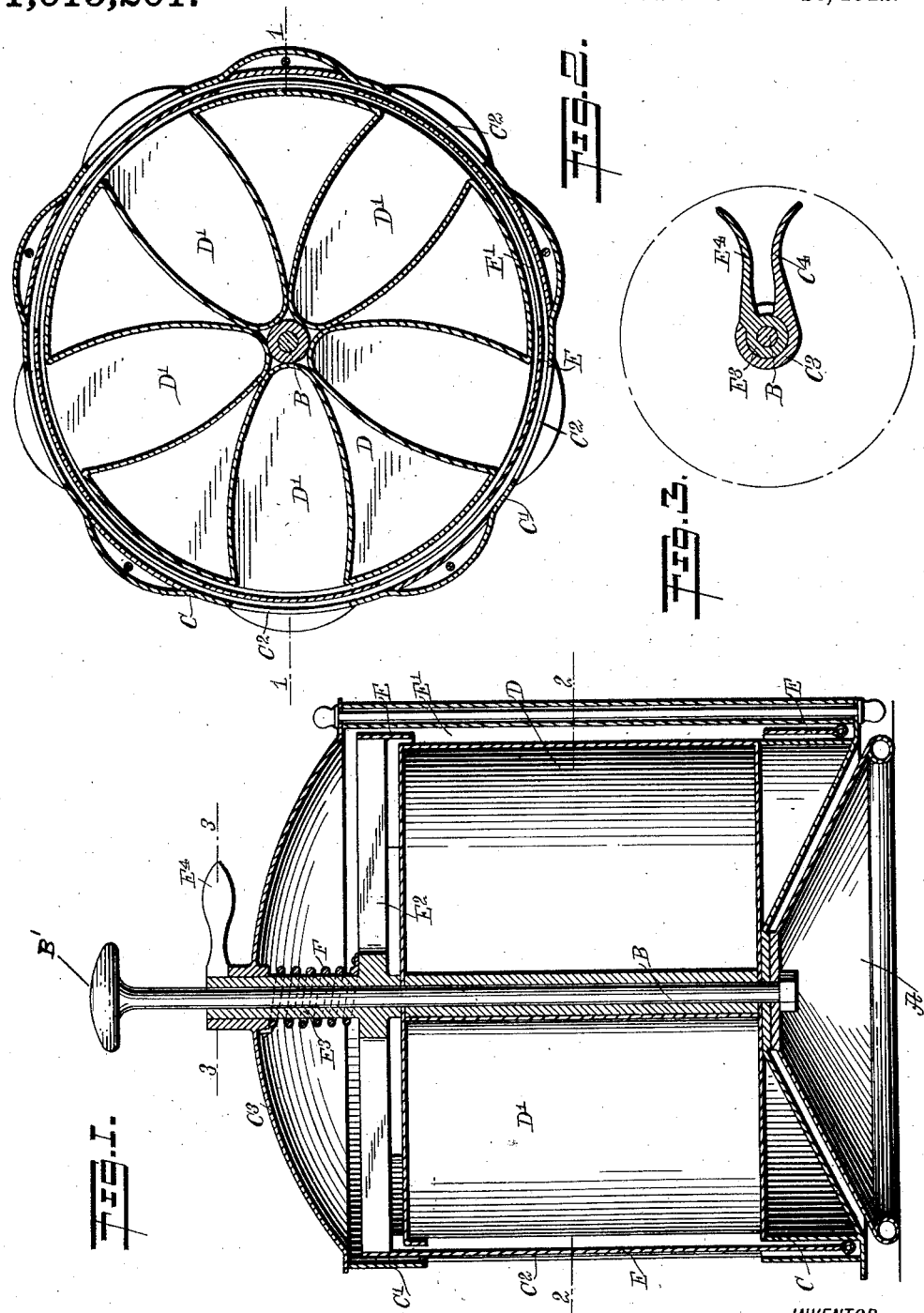

AUGUSTO MARINELLI, OF LORETO, ITALY.

TABLE-CASTER.

1,015,201. Specification of Letters Patent. Patented Jan. 16, 1912.

Application filed December 20, 1910. Serial No. 598,321.

*To all whom it may concern:*

Be it known that I, AUGUSTO MARINELLI, a subject of the King of Italy, and a resident of Loreto, Italy, have invented a new and Improved Table-Caster, of which the following is a full, clear, and exact description.

The object of the invention is to provide a new and improved table caster for carrying flasks or other holders containing oil, vinegar, sugar, salt, olives, cheese and the like, and arranged to normally conceal the holders and to allow access to the same for removal and use of their contents whenever desired.

For the purpose mentioned, use is made of a casing having openings and compartments for the reception of the flasks, and a manually-controlled cylindrical cut-off interposed between the side wall of the casing and the compartments to normally disconnect the compartments from the openings.

A practical embodiment of the invention is represented in the accompanying drawings forming a part of this specification, in which similar characters of reference indicate corresponding parts in all the views.

Figure 1 is a sectional side elevation of the table caster in closed position, the section being on the line 1—1 of Fig. 2; Fig. 2 is a sectional plan view of the same on the line 2—2 of Fig. 1; and Fig. 3 is a similar view of the same on the line 3—3 of Fig. 1.

The table caster is mounted upon a suitable stand having a conical face A supporting a post B, on which is mounted to turn a casing C having its side walls C' provided with spaced openings $C^2$ located opposite compartments D' formed in a drum D, arranged within and forming part of the casing C. Interposed between the side walls C' and the peripheral face of the drum D is arranged a cylindrical cut-off E having spaced cut-out portions E' normally out of register with the openings $C^2$ and the compartments D', as plainly indicated in Figs. 1 and 2, so that the flasks contained in the compartments D' are completely inclosed and hidden. Now, on turning the cut-off E, its cut-out portions E' can be moved in register with the openings $C^2$ so that access is had to the compartments D' and the flasks contained therein to allow the user of the caster to remove any one of the flasks on turning the casing and with it the drum D until the desired compartment is opposite the user. The cut-off E is provided with a spider $E^2$ having a hub $E^3$ mounted to turn on the post B, as plainly indicated in Fig. 1, and the upper end of the hub $E^3$ has a bearing in the top $C^3$ of the casing C, and on the outer end of the hub $E^3$ is arranged a handle $E^4$, located opposite a handle $C^4$ forming part of the top $C^3$. A spring F is coiled around the hub $E^3$ and is fastened at one end to the spider $E^2$ and at the other end to the top $C^3$, so that the cut-off E is normally held in a closed position, that is, with the openings thereof out of register with the openings $C^2$ of the casing and the compartments D'. Now by the user taking hold of the handles $E^4$, $C^4$ and pressing the handle $E^4$ toward the handle $C^4$, the cut-off E is rotated a sufficient distance to bring its cut-out portions E' in register with the openings $C^2$ so that all the compartments D' are opened and the flasks contained therein can be removed by the user through the corresponding registering openings $C^2$ and cut-out portions E'. When the operator releases the handles $C^4$, $E^4$, the spring F immediately returns the cut-off E to normal closed position. It is understood that by the use of the handle $C^4$, the operator can conveniently turn the casing C and the compartments D' to a desired position for obtaining any desired flask. The upper end of the post B is provided with a suitable handle B' to permit of conveniently moving the table caster about.

It is understood that when the table caster is not in use, the parts are in closed position, and hence the flasks and their contents are protected against dust, moisture, etc.

The table caster shown and described is very simple and durable in construction, can be cheaply manufactured, and is not liable easily to get out of order.

Having thus described my invention, I claim as new and desire to secure by Letters Patent:—

1. A table caster, comprising a rotary casing having openings in its side wall, a drum within the said casing and having compartments opposite the said openings, and a manually-controlled cut-off interposed between the said drum and the side wall of the casing to normally disconnect the compartments and the said openings, the cut-off having cut-out portions adapted to register with the said compartments and the said openings.

2. A table caster, comprising a rotary casing having openings in its side wall, a drum within the said casing and having compartments opposite the said openings, a manually-controlled cut-off interposed between the said drum and the side wall of the casing to normally disconnect the compartments and the said openings, the cut-off having cut-out portions adapted to register with the said compartments and the said openings, a handle on the said casing, a handle on the said cut-off and arranged opposite the said casing handle, and a spring pressing the said cut-off.

3. A table caster, comprising a stand having a central post, a cylindrical casing mounted to turn on the said post and having its side wall provided with spaced openings, a drum within the said casing and having compartments for the reception of holders, the compartments being opposite the said openings, a cylindrical cut-off interposed between the said drum and the side wall of the casing, the cut-off having spaced cut-out portions adapted to register with the said casing openings and the said compartments, the said cut-off being mounted to turn on the said post, a spring pressing the said cut-off to hold the latter normally in closed position, and opposite handles on the said casing and cut-off.

4. A table caster, comprising a rotary casing having openings in its side wall, a drum in the casing and having compartments opposite the openings of said casing, a spring actuated cut-off interposed between the drum and casing and having openings adapted to register with the compartments of the drum and the openings of the casings, and means for turning the cut-off against the action of its spring.

In testimony whereof I have signed my name to this specification in the presence of two subscribing witnesses.

AUGUSTO MARINELLI.

Witnesses:
 FRANCESCO PITTERI,
 CAVICAHIO LUIGIA.